United States Patent
Sinha et al.

(10) Patent No.: US 11,245,606 B1
(45) Date of Patent: Feb. 8, 2022

(54) NETWORK LATENCY TIME MEASUREMENT USING DNS AND WEB SERVER MESSAGES

(71) Applicant: T-Mobile USA, Inc., Bellevue, WA (US)

(72) Inventors: Ruchir Sinha, Newcastle, WA (US); Rajesh Gulati, Kirkland, WA (US); Anandajothi Muttayane, Renton, WA (US); Kameswaran Arunachalam, Redmond, WA (US); Jeffery Smith, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/165,846

(22) Filed: Feb. 2, 2021

(51) Int. Cl.
*H04L 12/26* (2006.01)
*H04L 29/12* (2006.01)

(52) U.S. Cl.
CPC ...... *H04L 43/0864* (2013.01); *H04L 61/1511* (2013.01)

(58) Field of Classification Search
None
See application file for complete search history.

(56) References Cited

U.S. PATENT DOCUMENTS

| | | | |
|---|---|---|---|
| 8,122,082 B2* | 2/2012 | Klein | H04L 67/2819 709/203 |
| 2016/0094467 A1* | 3/2016 | Hong | H04L 63/0281 370/235 |
| 2017/0272470 A1* | 9/2017 | Gundamaraju | H04W 4/24 |
| 2019/0229900 A1* | 7/2019 | Khristi | H04L 9/3236 |

* cited by examiner

Primary Examiner — Minh Chau Nguyen
Assistant Examiner — Ishrat Rashid
(74) Attorney, Agent, or Firm — Han Santos, PLLC

(57) ABSTRACT

A first time that a Domain Name System (DNS) response message is sent by the gateway server of a network to a user device may be determined, the DNS response message being generated by a Local DNS server of the network in response to a DNS request message from the user device for routing via the gateway server to the user device. A second time that a client handshake message for an external server identified by a network address in the DNS response is received at the gateway server may be determined, in which the client handshake message is sent by the user device. A roundtrip time for the network that is a time difference between the first time and the second time is calculated. The roundtrip trip time is then halved to obtain a network latency time measurement for the network.

20 Claims, 4 Drawing Sheets

US 11,245,606 B1

NETWORK LATENCY TIME MEASUREMENT USING DNS AND WEB SERVER MESSAGES

BACKGROUND

Some Mobile Network Operators (MNOs) may lack a completely internal way of measuring network latency of their wireless carrier networks. Conventional network measurement techniques often use Transport Layer Protocol (TCP) signaling or data transport events between a client device and a web server to measure network latency for a network. For example, such techniques may use roundtrip times for TCP handshake events or TCP data request and transport events to calculate network latency. However, some of these TCP events may be not visible to a wireless carrier network that provides the underlying wireless data communication channels. Accordingly, MNOs may have to rely on third-party network performance assessment service providers to measure the network latencies of their wireless carrier networks. These third-party service providers generally use propriety measurement algorithms and methodologies. As a result, MNOs have no ways of determining or verifying the accuracies of these measurements.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
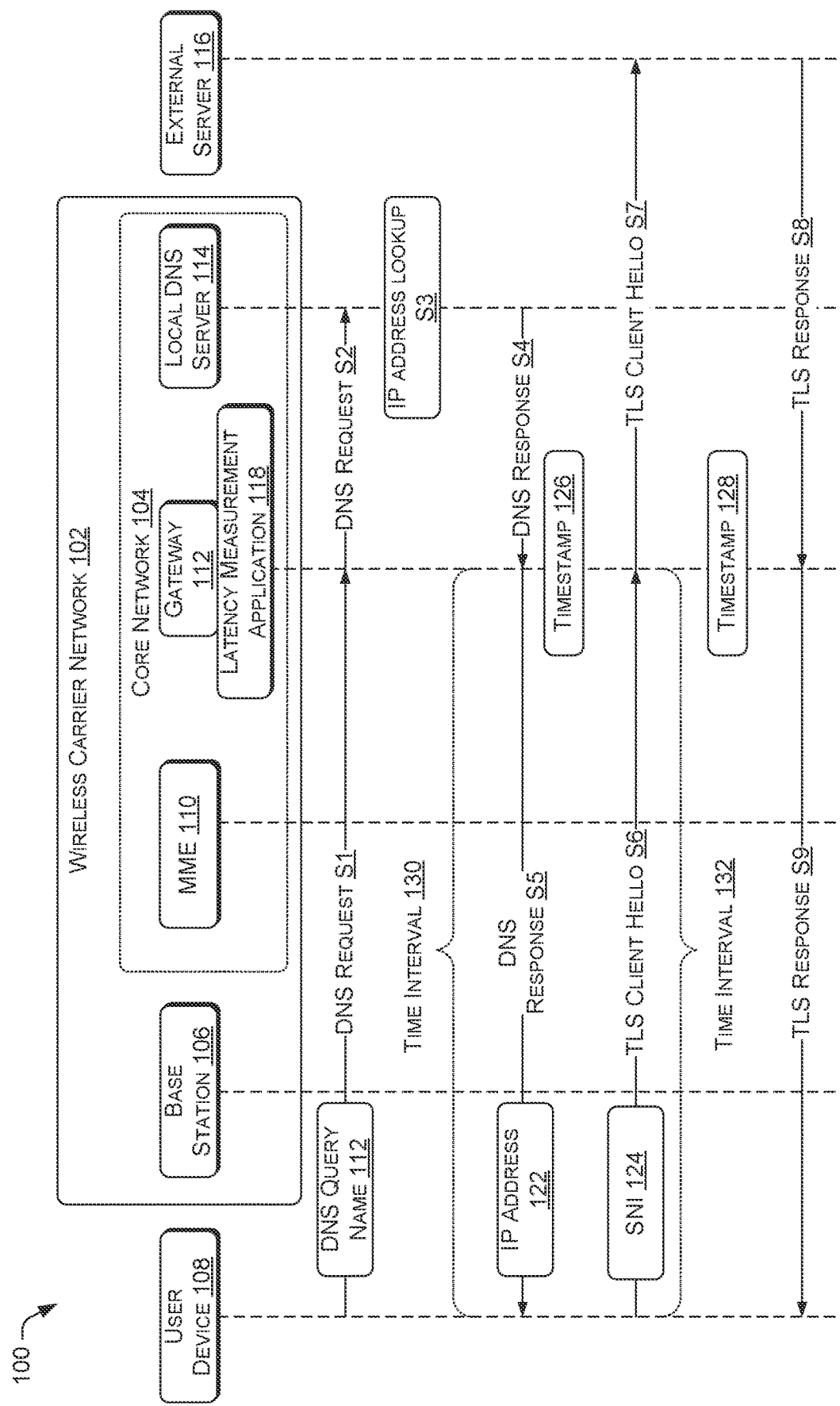
FIG. 1 illustrates an example architecture that enables a Mobile Network Operator (MNO) to use Domain Name System (DNS) and web server request messages to measure a network latency of a wireless carrier network.

This disclosure is directed to techniques that use a combination of a Domain Name System (DNS) event and a Transport Security Layer (TLS) handshake event to calculate a network latency of a wireless carrier network. The calculation may be performed by a latency measurement application that resides on a gateway server, such as a Packet Data Network Gateway (PGW) server, in a core network of the wireless carrier network. The gateway server may receive a Domain Name System (DNS) request message from a user device that is destined for a local DNS server that is internal to the wireless carrier network. The DNS request message may include a domain name for which the user device is requesting a corresponding Internet Protocol (IP) address. A DNS response message from the Local DNS server, in which the message contains the original domain name and the corresponding IP Address, is then routed by the gateway server to the user device. The time at which the gateway server routed the DNS response to the user device is the first time used for calculating the network latency.

Once the user device receives the DNS response message, the user device may send a TLS client hello message to a web server whose IP address is in the DNS response, in which this TLS client hello message passes through the gateway server on its way to the web server. This TLS client hello message includes a server name indicator (SNI) that matches the domain name in the DNS response message. The time that this corresponding TLS client hello message is received by the gateway server while on its way to the web server is the second time used for the calculation of the network latency. Accordingly, the latency monitoring application may calculate a roundtrip time that is a time difference between the first time and the second time. The roundtrip time is then divided in half by the latency measurement application to generate a network latency time measurement. In various embodiments, the latency measurement application may obtain the first time and the second time from corresponding event timestamps of data transactions that are recorded in a data traffic log maintained by the gateway server.

In such embodiments, the gateway server may have visibility to a Mobile Station International Subscriber Directory Number (MSISDN) of the user device as the gateway server routes the DNS request and response messages between the user device and the local DNS server. However, TLS client hello messages that are initiated by user devices may be routed by the gateway server without the gateway server having visibility to the MSISDNs of sending user devices. This is because the TLS client hello messages are exchanged between the user devices and the web servers via corresponding Transmission Control Protocol (TCP) connections. Further, it is possible that information from the data traffic log may show that there are multiple TLS client hello messages sent in a relatively short period of time to the same web server, in which these TLS client hello messages all contain the same SNI. The multiple TLS client hello messages may have originated from the same user device and/or different user devices.

Thus, the latency measurement application may be configured to use information from the data traffic log to match a DNS response message that is received by the particular user device to a corresponding TLS client hello message that is sent by a particular user device. In other words, the latency measurement application may determine that a particular TLS client hello message corresponds to a DNS response message when the particular TLS client hello message has a specific SNI that matches the domain name in the DNS response message. The event timestamp of the particular TLS client hello message is then used as the second time for the calculation of the network latency time measurement.

However, if the information in the data traffic log shows that there are multiple TLS client hello messages with the specific SNI and corresponding multiple event timestamps, the latency measurement application may determine that a particular TLS client hello message corresponds to a DNS response message when (1) the particular TLS client hello message of the multiple TLS client hello messages has a specific SNI that matches the domain name in the DNS response message; and (2) the data traffic log indicates that the particular TLS client hello message has an event timestamp that shows a time that is closest in time to the first time. Once again, the first time is the time at which the gateway server routed the DNS response message with the matching domain name to the user device. The event timestamp of the particular TLS client hello message is then used as the second time for the calculation of the network latency time measurement.

The use of DNS and web server messages to calculate a network latency may enable an MNO to independently assess the network latency of its wireless carrier network without having to rely on third-party network performance assessment service providers. Further, the MNO may compare the calculated network latency measurements to network impairment events or network modification events to determine the impact of such events on network latency measurements. Additionally, the MNO may compare the calculated network latency measurements to key performance indicators (KPIs) of the wireless carrier network or quality of experience (QoE) KPIs related to one or more user devices to assess the relationship between the network latency measurements and the various KPIs. The techniques described herein may be implemented in a number of ways. Example implementations are provided below with reference to the following figures.

Example Architecture

FIG. 1 illustrates an example architecture 100 that enables a Mobile Network Operator (MNO) to use Domain Name System (DNS) and web server request messages to measure a network latency of a wireless carrier network 102. The wireless carrier network 102 may include a core network 104 and a radio access network. The radio access network may include multiple base stations, such as a base station 106. Each base station may include a base transceiver system (BTS) that communicates via an antenna system over an air-link with one or more user devices that are within range. The BTS may send radio communication signals to user devices and receive radio communication signals from user devices. The base stations may provide corresponding network cells that deliver telecommunication and data communication coverage to user devices, such as the user device 108. The user devices may include a smartphone, a tablet computer, an embedded computer system, or any other device that is capable of using the wireless communication services that are provided by the wireless carrier network.

The core network 104 may use the network cells to provide wireless communication services to the user devices. The core network 104 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 104 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network 104. The EPC may include a Mobility Management Entity (MME) 110. The MME 110 may handle paging, authentication, and registration of user devices, as well as the routing of data and voice communications through selected gateways, such as the gateway 112. For example, the gateway 112 may be a Packet Data Network Gateway (PGW) or some other equivalent gateway. The gateway 112 may provide the user devices with access to a local DNS server 114 that is operated by the wireless carrier network 102. The local DNS server 114 may be used by the wireless carrier network 102 to resolve IP addresses for DNS requests that are made by the user devices communicatively connected to the network. For example, the local DNS server 114 may provide an IP address that corresponds to a particular domain name (e.g., google.com) that is included in a DNS request. The local DNS server 114 of the wireless carrier network 102 may be connected to an external root DNS server via the Internet, such that the external root DNS server may update the local DNS server with corresponding IP addresses for various domain names. Additionally, the gateway 112 may also provide the user devices that are communicatively connected to the wireless carrier network 102 with access to other online resources via the Internet, such as an external server 116 (e.g., a web server).

The gateway 112 may maintain a data traffic log that tracks the data transaction events that are routed through the gateway 112. For example, the data traffic log may be an Enhanced Data Record (EDR) that is generated by a gateway server of the gateway 112. The gateway server of the gateway 112 may further host a latency measurement application 118 that calculates a network latency for the wireless carrier network 102.

In various embodiments, an application (e.g., a web browser) on the user device 108 may perform a series of operations to establish communication with the external server 116. At S1, the user device 108 may send a DNS request message to the core network 104. The DNS request message may contain a DNS query name 120 that the application on the user device 108 wants to resolve into an IP address. The DNS request may include a device identifier (e.g., an MSISDN) of the user device 108. The DNS request message may be routed to the gateway 112 via the base station 106 and the MME 110. At S2, the DNS request message may be routed by the gateway 112 to the local DNS server 114.

At S3, the local DNS server 114 may perform an IP address lookup for the DNS query name 120 and resolves an IP address 122 for the DNS query name. At S4, the local DNS server 114 may return a DNS response message that includes the IP address 122 that is received at the gateway 112. At S5, the gateway 112 may route the DNS response message that includes the IP address 122 to the user device 108 via the MME 110 and the base station 106. The DNS response message may further include the domain name that was present in the DNS request message sent at S1. In various embodiments, the MME 110 may route the DNS response message to the user device 108 based on the device identifier (e.g., the MSISDN) of the user device 108.

At S6, the user device 108 may send a TLS client hello message that is destined for an external server. For example, the external server may be the external server 116 that is reachable via the IP address 122. In some embodiments, the user device 108 may send the TLS client hello message after the application on the user device 108 has established a TCP connection between the application on the user device 108 and the external server 116. The TLS client hello message may include an SNI 124 that matches the domain name included in the DNS response message. The TLS client hello message may be received at the gateway 112 via the base station 106 and the MME 110. At S7, the gateway 112 may pass the TLS client hello message that originated from the user device 108 to the external server 116. At S8, the external server 116 may return a TLS response message that is destined for the application on the user device 108. For example, the TLS response message may be a TLS server hello message that acknowledges the TLS client hello message. The TLS response message may be received at the gateway 112. At S9, the gateway 112 may pass the TLS response message to the user device 108 via the MME 110 and the base station 106. The TLS client hello message and the TLS response may complete a TLS handshake that prepares the user device 108 and the external server 116 to exchange data, so that the user device 108 may download data from the external server 116.

The latency measurement application 118 may calculate a network latency for at least a portion of the wireless carrier network 102 that services the user device 108 based on a timestamp 126 and a timestamp 128 of corresponding data transaction events recorded in the data traffic log of the gateway server. For example, the portion of the wireless carrier network 102 may be a 5G portion of the wireless carrier network. The timestamp 126 may record a first time that the DNS response message from the local DNS server 114 is sent by the gateway 112 to the user device 108. The timestamp 128 may record a second time that the TLS client hello message as sent by the application on the user device 108 is received by the gateway 112. Accordingly, the latency measurement application 118 may calculate a roundtrip time that is a time difference between the first time and the second time. As shown in FIG. 1, the time difference between the first time and the second time includes a time interval 130 and a time interval 132. The time interval 130 may be the time that it takes for the DNS response message from the gateway 112 to reach the user device 108. The time interval 130 may be the time it takes for the TLS client hello message from the user device 108 to reach the gateway 112. The time difference between the first time and the second time may further include any time used by an application on the user device 108 to receive and process the DNS response message, and then generate the TLS client hello message. The roundtrip time is then divided in half by the latency measurement application 118 to generate a network latency time measurement for the portion of the wireless carrier network 102 that services the user device 108.

Example Latency Measurement Application Components

Figure 2:
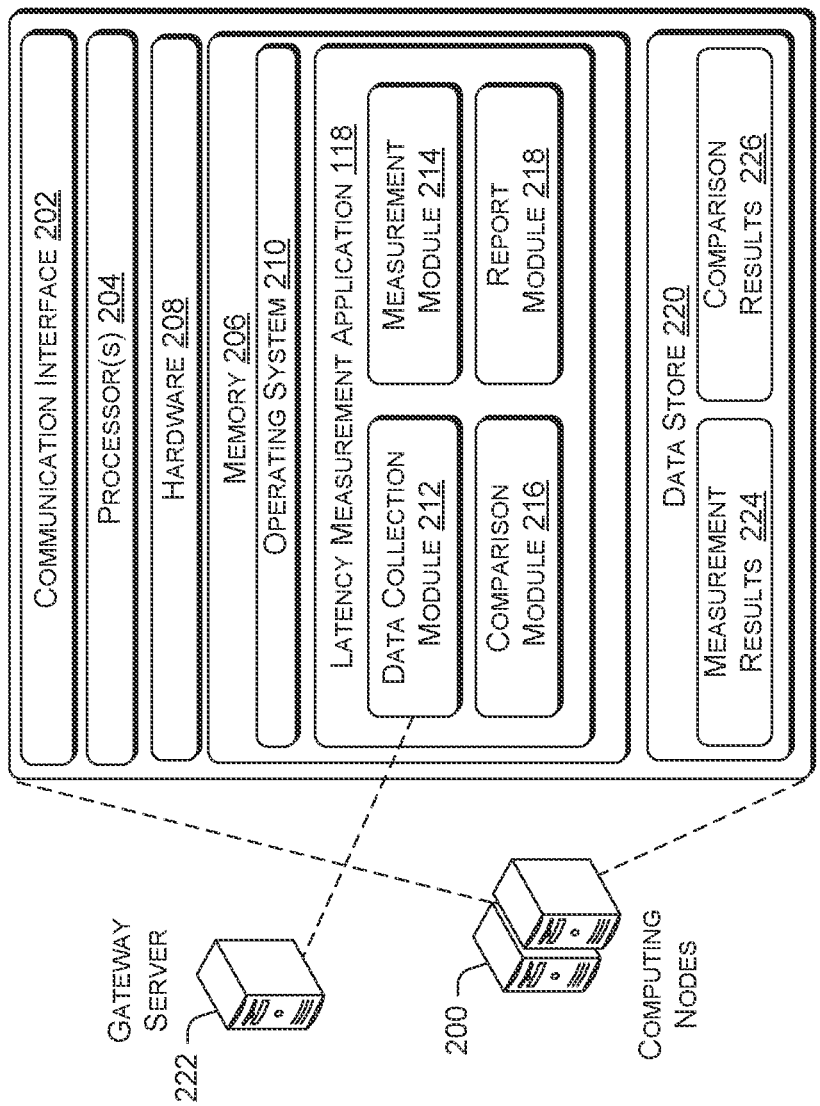
FIG. 2 is a block diagram showing various components of a latency measurement application that is used by an MNO to measure the network latency of a wireless carrier network based on DNS and web server request messages.

FIG. 2 is a block diagram showing various components of a latency measurement application that is used by an MNO to measure the network latency of a wireless carrier network based on DNS and web server request messages. For example, the latency measurement application 118 may execute one or more computing nodes 200. The computing nodes 200 may provide a communication interface 202, one or more processors 204, memory 206, and hardware 208. The communication interface 202 may include wireless and/or wired communication components that enable the devices to transmit data to and receive data from other networked devices. The hardware 208 may include additional hardware interface, data communication, or data storage hardware. For example, the hardware interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 204 and the memory 206 of the computing nodes 200 may implement an operating system 210. In turn, the operating system 210 may provide an execution environment for the latency measurement application 118. The operating system 210 may include components that enable the computing nodes 200 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The latency measurement application 118 may include a data collection module 212, a measurement module 214, a comparison module 216, and a report module 218. The modules may include routines, program instructions, objects, and/or data structures that perform particular tasks or implement particular abstract data types. The memory 206 may also include a data store 220 that is used by the latency measurement application 118.

The data collection module 212 may retrieve data from a data traffic log that is maintained by a gateway server 222 of the gateway 112. The data collection module 212 may be directed to do so by the measurement module 214. In various embodiments, the data collection module 212 may retrieve data associated with DNS response events and TLS client hello message events from the data traffic log. In various embodiments, the data collection module 212 may use a data adaptor to retrieve the data from a database that contains the data traffic log. For example, the data collection module 212 may use a data-agnostic data adaptor to access an unstructured database, and/or a database-specific data adaptor to access a structured database. In some embodiments, the data collection module 212 may include a workflow scheduler that schedules the retrieval of the data from the data traffic log according to a configurable policy. For example, the configurable policy may specify the source data locations, dates and times of data retrievals, frequency of data retrievals, triggering events for the data retrievals, handling procedures for late arrival data, a data retention period, data disposal following an expiration of the data retention period, and/or so forth.

The measurement module 214 may calculate a roundtrip time that is a time difference between a first time and a second time. The roundtrip time is then divided in half by the measurement module 214 to generate a network latency time measurement. The first time may be a time that a DNS response message from the local DNS server 114 is sent by the gateway 112 to a user device. The second time may be a time that a subsequent corresponding TLS client hello message as sent by the application on the user device is received by the gateway 112, in which the corresponding TLS client hello message includes an SNI that matches the domain name in the DNS response message. In various embodiments, the measurement module 214 may obtain the first time and the second time from corresponding event timestamps of data transactions that are recorded in the data traffic log.

Thus, the measurement module 214 may be configured to use information from the data traffic log to match a DNS response message that is received by the particular user device to a corresponding TLS client hello message that is sent by a particular user device. In other words, the latency measurement application may determine that a particular TLS client hello message corresponds to a DNS response message when the particular TLS client hello message has a specific SNI that matches the domain name in the DNS response message. The event timestamp of the particular TLS client hello message is then used by the measurement module 214 as the second time for the calculation of the network latency time measurement.

However, if the information in the data traffic log shows that there are multiple TLS client hello messages with the specific SNI and corresponding multiple event timestamps, the measurement module 214 may determine that a particular TLS client hello message of the multiple TLS hello messages corresponds to a DNS response message when (1) the particular TLS client hello message has a specific SNI that matches the domain name in the DNS response message; and (2) the data traffic log indicates that the particular TLS client hello message has an event timestamp that shows a time that is closest in time to the first time. Once again, the first time is the time at which the gateway server routed the DNS response message with the matching domain name to the user device. The event timestamp of the particular TLS client hello message is then used by the measurement module 214 as the second time for the calculation of the network latency time measurement.

The measurement module 214 may store the network latency time measurement results 224 in the data store 220. Each of the results 224 may include a network latency time measurement, a user identifier of a corresponding user device that was used to generate the measurement, an identifier of the base station that was involved in the measurement, a region identifier of the cell region that includes the base station, and/or so forth.

The comparison module 216 may compare the calculated network latency time measurements to other diagnostic data. In various embodiments, the comparison module 216 may access the diagnostic data from various databases maintained by the wireless carrier network 102. The diagnostic data may include network impairment events, network modification events, KPIs of the wireless carrier network, QoE KPIs of one or more user devices. The comparison module 216 may compare a calculated network latency time measurement to specific diagnostic data based on comparison parameters inputted by a human administrator. In some instances, the comparison module 216 may be used to compare the calculated network latency measurements to network impairments or network modification events to indicate the impact of such events on network latency measurements. In other instances, the comparison module 216 may be used to compare the calculated network latency measurements to the KPIs of the wireless carrier network or one or more QoE KPIs related to one or more user devices to indicate the relationship between the network latency measurements and the various KPIs. The comparison module 216 may store the comparison results 226 in the data store 220.

The report module 218 may generate reports of the network latency time measurements and comparison results for presentation. In various embodiments, the reports may be in the form of charts, graphs figures, models, schematics, maps, summaries, reports, logs, and/or so forth. In various embodiments, the report module 218 may generate reports based on reporting parameters inputted by a human administrator. In some instances, the report module 218 may output the reports to a display device for visual presentation. In some embodiments, the human administrator may input additional commands for performing functions such as view zoom in, view zoom out, display data filtering, display data overlay, view panning, view rotation, etc. Alternatively, or concurrently, the report module 218 may output the reports to an audio speaker device for audio presentation. In other instances, the report module 218 may deliver the reports via other data delivery services, such as delivery through cloud-based team collaboration tools, delivery through email, delivery through messaging services, such as Short Message Service (SMS) messaging, Multimedia Messaging Service (MMS) messaging, Rich Communication Services (RCS) messaging, and/or so forth.

Example Processes

Figure 3:
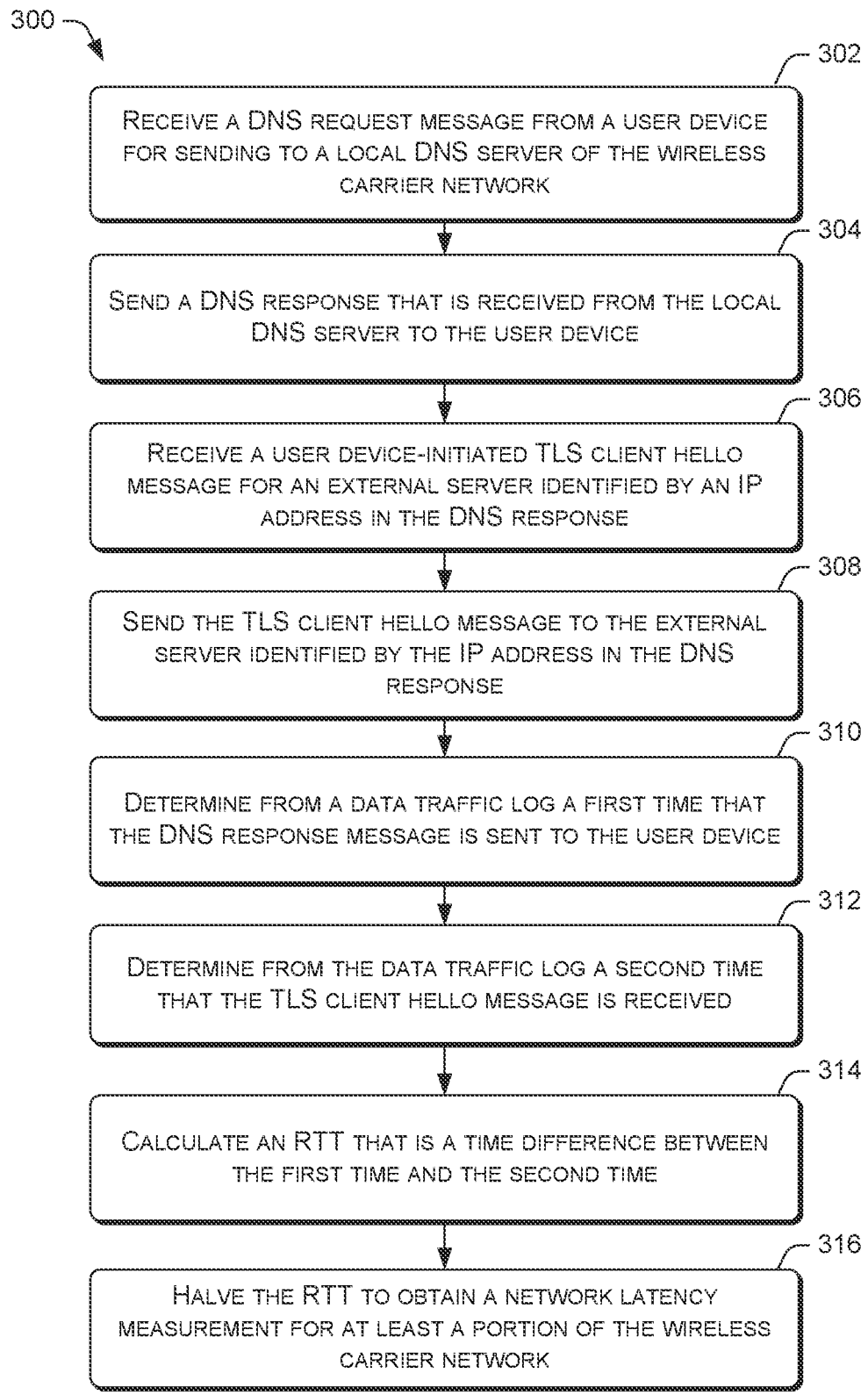
FIG. 3 is a flow diagram of an example process for using DNS and web server messages to calculate a network latency of a wireless carrier network.
Figure 4:
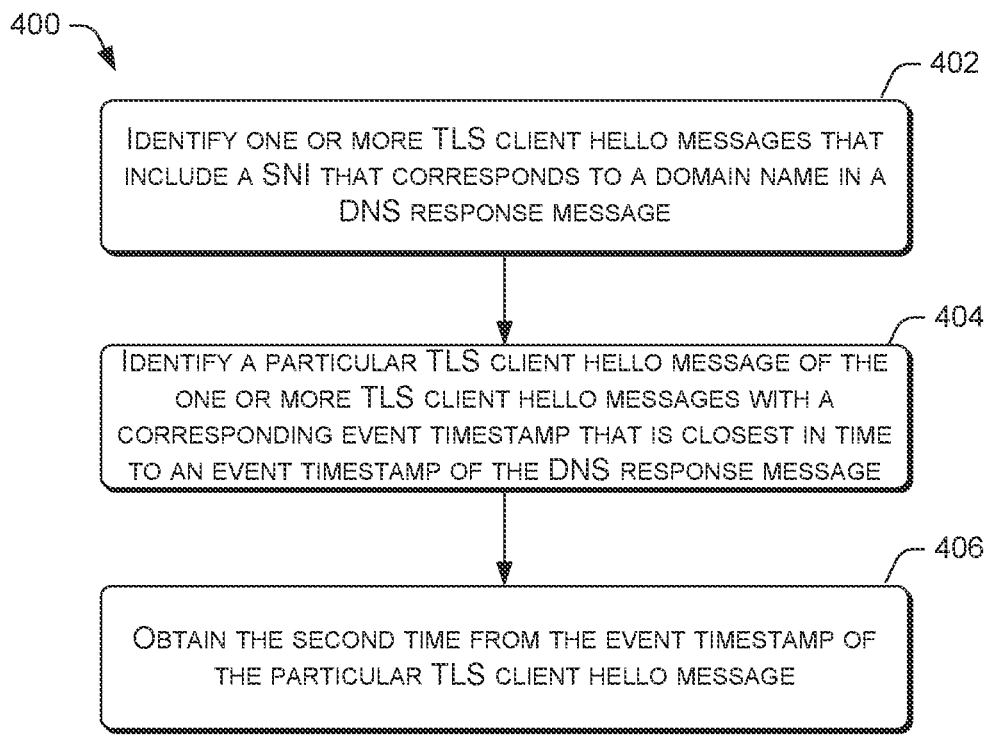
FIG. 4 is a flow diagram of an example process for obtaining a time from an event timestamp of a Transport Layer Security (TLS) message that is sent from a user device to a web server.

FIGS. 3 and 4 present illustrative processes 300 and 400 for using DNS and web server messages to calculate a network latency of a wireless carrier network. Each of the processes 300 and 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300 and 400 are described with reference to the architecture 100 of FIG. 1.

FIG. 3 is a flow diagram of an example process 300 for using DNS and web server messages to calculate a network latency of a wireless carrier network. At block 302, the gateway 112 may receive a DNS request from a user device for sending to a local DNS server of the wireless carrier network. The DNS request message may include a domain name for which the user device is requesting a corresponding IP address. At block 304, the gateway 112 may send a DNS response message that the gateway 112 received from the local DNS server to the user device. The DNS response message may include the IP address and the domain name.

At block 306, the gateway 112 may receive a user device-initiated TLS client hello message for an external server identified by an IP address in the DNS response message. The TLS client hello message includes an SNI that matches the domain name in the DNS response message. In various embodiments, the user device may send the TLS client hello message after the application on the user device has established a TCP connection between the application on the user device and the external server.

At block 308, the gateway 112 may send the TLS client hello messages to the external server identified by the IP address in the DNS response message. In turn, the external server may return a TLS response message that acknowledges the TLS client hello message. At block 310, a latency measurement application 118 of the gateway 112 may determine from a data traffic log of the gateway 112 a first time that the DNS response message is sent to the user device. At block 312, the gateway 112 may determine from the data traffic log a second time that the TLS client hello message is received by the gateway 112. In various embodiments, the latency measurement application 118 may obtain the first time and the second time from corresponding event timestamps of data transactions that are recorded in a data traffic log maintained by the gateway server. At block 314, a latency measurement application 118 may calculate a roundtrip time that is a time difference between the first time and the second time. At block 316, the latency measurement application 118 may halve the roundtrip time to obtain a network latency measurement for at least a portion of the wireless carrier network.

FIG. 4 is a flow diagram of an example process 400 for obtaining a time from an event timestamp of a Transport Layer Security (TLS) message that is sent from a user device to a web server. The process 400 may further illustrate block 312 of the process 300. At block 402, the latency measurement application 118 may identify one or more TLS hello messages that include an SNI that corresponds to a domain name in a DNS response message. At block 404, the latency measurement application 118 may identify a particular TLS client hello message of the one or more TLS client hello messages with a corresponding event timestamp that is closest in time to an event timestamp of the DNS response message. At block 406, the latency measurement application 118 may obtain the second time from the event timestamp of the particular TLS client hello message.

The use of DNS and web server messages to calculate a network latency may enable an MNO to independently assess the network latency of its wireless carrier network without having to rely on third-party network performance assessment service providers. Further, the MNO may compare the calculated network latency measurements to network impairment events or network modification events to assess the impact of such events on network latency measurements. Additionally, the MNO may compare the calculated network latency measurements to KPIs of the wireless carrier network or one or more QoE KPIs related to one or more user devices to assess the relationship between the network latency measurements and the various KPIs.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a wireless carrier network storing computer-executable instructions that upon execution cause one or more processors to perform acts comprising:

receiving, at a gateway server of the wireless carrier network, a Domain Name System (DNS) request message from a user device for sending to a local DNS server of the wireless carrier network;

sending, via the gateway server, a DNS response message that is received from the local DNS server to the user device, the DNS response message being a response by the Local DNS server to the DNS request message;

receiving, at the gateway server, a Transport Layer Security (TLS) client hello message for an external server identified by an Internet Protocol (IP) address in the DNS response, the TLS client hello message being initiated by the user device;

sending, via the gateway server, the TLS client hello message to the external server identified by the IP address in the DNS response message;

determining, from a data traffic log of the gateway server, a first time that the DNS response is sent by the gateway server to the user device;

determining, from the data traffic log of the gateway server, a second time that the TLS client hello message is received at the gateway server; and calculating a roundtrip time that is a time difference between the first time and the second time; and halving the roundtrip trip time to obtain a network latency time measurement for at least a portion of the wireless carrier network.

2. The one or more non-transitory computer-readable media of claim 1, wherein the user device is identified by a Mobile Station International Subscriber Directory Number (MSISDN) and the DNS request message includes a specific domain name, and wherein the determining the first time includes identify the first time from an event timestamp in the data traffic log that belongs to a particular DNS response event, in which the particular DNS response event indicates that the gateway server routed a particular DNS response that includes the specific domain name to the user device via the MSISDN.

3. The one or more non-transitory computer-readable media of claim 1, wherein the TLS client hello message includes a Server Name Indicator (SNI) that corresponds to the domain name, and wherein the determining the second time includes identifying the second time from an additional event timestamp in the data traffic log that belongs to a particular client hello message event, in which the particular client hello message event indicates that the gateway server received the TLS client hello message that includes the SNI.

4. The one or more non-transitory computer-readable media of claim 3, wherein the particular TLS client hello message event is one of a plurality of client hello message events with corresponding multiple event timestamps for TLS client hello messages that include the SNI name, in which the additional event timestamp of the particular client hello message event is one of the multiple timestamps that is closest in time to the event timestamp belonging to the particular DNS response event.

5. The one or more non-transitory computer-readable media of claim 1, wherein the acts further comprise sending, via the gateway server, a TLS server response message that responds to the TLS client hello message to the user device, the TLS server response message being initiated by the external server.

6. The one or more non-transitory computer-readable media of claim 1, wherein the TLS client hello message is sent by the user device following an establishment of a Transmission Control Protocol (TCP) connection between the user device and the external server via the wireless carrier network.

7. The one or more non-transitory computer-readable media of claim 1, wherein the TLS client hello is sent by the gateway server to the external server via the Internet.

8. The one or more non-transitory computer-readable media of claim 1, wherein the local DNS server of the wireless carrier network is connected to a root DNS server via the Internet.

9. The one or more non-transitory computer-readable media of claim 1, wherein the portion of the wireless carrier network is a 5G wireless network portion.

10. The one or more non-transitory computer-readable media of claim 1, wherein the acts further comprise correlating the network latency time measurement to a network impairment event or a network modification event that affects at least the portion of the wireless carrier network.

11. The one or more non-transitory computer-readable media of claim 1, wherein the acts further comprise correlating the network latency time measurement to one or more network key performance indicators (KPIs) of the wireless carrier network or one or more quality of experience (QoE) KPIs related to the user device.

12. The one or more non-transitory computer-readable media of claim 1, wherein the gateway server is a Packet Data Network Gateway (PGW) server of the wireless carrier network.

13. A gateway server, comprising:
one or more processors; and
memory including a plurality of computer-executable components that are executable by the one or more processors to perform a plurality of actions, the plurality of actions comprising:
determining a first time that a Domain Name System (DNS) response message is sent by the gateway server of a network to a user device, the DNS response message being generated by a Local DNS server of the network in response to a DNS request message from the user device for routing via the gateway server to the user device;
determining a second time that a client handshake message for an external server identified by a network address in the DNS response is received at the gateway server for sending to the external server, the client handshake message being sent by the user device;
calculating a roundtrip time for the network that is a time difference between the first time and the second time; and
halving the roundtrip trip time to obtain a network latency time measurement for the network.

14. The gateway server of claim 13, wherein the user device is identified by a Mobile Station International Subscriber Directory Number (MSISDN) and the DNS request message includes a specific domain name, and wherein the determining the first time includes identify the first time from an event timestamp in a data traffic log of the server that belongs to a particular DNS response event, in which the particular DNS response event indicates that the gateway server routed a particular DNS response that includes the specific domain name to the user device via the MSISDN.

15. The gateway server of claim 13, wherein the client handshake message is a Transport Layer Security (TLS) client hello message that is sent by the user device following an establishment of a Transmission Control Protocol (TCP) connection between the user device and the external server.

16. The gateway server of claim 14, wherein the TLS client hello message includes a Server Name Indicator (SNI) that corresponds to the domain name, and wherein the determining the second time includes identifying the second time from an additional event timestamp in a data traffic log of the server that belongs to a particular client hello message event, in which the particular client hello message event indicates that the gateway server received the TLS client hello message that includes the SNI.

17. The gateway server of claim 14, wherein the particular TLS client hello message event is one of a plurality of client hello message events with corresponding multiple event timestamps for TLS client hello messages that include the SNI name, in which the additional event timestamp of the particular client hello message event is one of the multiple timestamps that is closest in time to the event timestamp belonging to the particular DNS response event.

18. A computer-implemented method, comprising:
receiving, at a gateway server of the wireless carrier network, a Domain Name System (DNS) request message from a user device for sending to a local DNS server of the wireless carrier network;
sending, via the gateway server, a DNS response message that is received from the local DNS server to the user device, the DNS response message being a response by the Local DNS server to the DNS request message;
receiving, at the gateway server, a Transport Layer Security (TLS) client hello message for an external server identified by an Internet Protocol (IP) address in the DNS response, the TLS client hello message being initiated by the user device;
sending, via the gateway server, the TLS client hello message to the external server identified by the IP address in the DNS response message;
determining, from a data traffic log of the gateway server, a first time that the DNS response is sent by the gateway server to the user device;
determining, from the data traffic log of the gateway server, a second time that the TLS client hello message is received at the gateway server; and
calculating, via an application executed by the wireless carrier network, a roundtrip time that is a time difference between the first time and the second time; and
halving, via the application, the roundtrip trip time to obtain a network latency time measurement for at least a portion of the wireless carrier network.

19. The computer-implemented method of claim 18, wherein the user device is identified by a Mobile Station International Subscriber Directory Number (MSISDN) and the DNS request message includes a specific domain name, and wherein the determining the first time includes identifying the first time from an event timestamp in the data traffic log that belongs to a particular DNS response event, in which the particular DNS response event indicates that the gateway server routed a particular DNS response that includes the specific domain name to the user device via the MSISDN.

20. The computer-implemented method of claim 18, wherein the TLS client hello message includes a Server Name Indicator (SNI) that corresponds to the domain name, and wherein the determining the second time includes identifying the second time from an additional event timestamp in the data traffic log that belongs to a particular client hello message event, in which the particular client hello message event indicates that the gateway server received the TLS client hello message that includes the SNI.

* * * * *